(12) United States Patent
Ueta

(10) Patent No.: US 7,815,197 B2
(45) Date of Patent: Oct. 19, 2010

(54) GASKET

(75) Inventor: Kosaku Ueta, Ohsato-gun (JP)

(73) Assignee: Japan Metal Gasket Co., Ltd., Saitama (JP)

( * ) Notice: Subject to any disclaimer, the term of this patent is extended or adjusted under 35 U.S.C. 154(b) by 33 days.

(21) Appl. No.: 11/497,081

(22) Filed: Aug. 1, 2006

(65) Prior Publication Data

US 2007/0090608 A1    Apr. 26, 2007

(30) Foreign Application Priority Data

Oct. 20, 2005 (JP) ............................ 2005-305790
Dec. 19, 2005 (JP) ............................ 2005-364972

(51) Int. Cl.
   *F02F 11/00* (2006.01)
(52) U.S. Cl. ....................... 277/593; 277/595
(58) Field of Classification Search .......... 277/592–595
   See application file for complete search history.

(56) References Cited

U.S. PATENT DOCUMENTS

| 843,394 | A | * | 2/1907 | Haynes | 277/595 |
| 4,203,608 | A | * | 5/1980 | Nicholson | 277/595 |
| 4,335,890 | A | * | 6/1982 | Nicholson | 277/595 |
| 4,451,051 | A | * | 5/1984 | Nicholson | 277/595 |
| 5,306,024 | A | * | 4/1994 | Udagawa | 277/592 |
| 5,711,537 | A | * | 1/1998 | Inamura et al. | 277/595 |
| 5,775,701 | A | * | 7/1998 | Martini | 277/591 |
| 5,938,208 | A | * | 8/1999 | Yoshida et al. | 277/592 |
| 6,036,195 | A | * | 3/2000 | Udagawa | 277/595 |
| 6,422,573 | B1 | * | 7/2002 | Sekioka | 277/594 |
| 7,000,924 | B2 | * | 2/2006 | Hohe et al. | 277/593 |
| 7,204,491 | B2 | * | 4/2007 | Hatamura et al. | 277/593 |
| 7,293,779 | B2 | * | 11/2007 | Inciong et al. | 277/594 |
| 2005/0173868 | A1 | | 8/2005 | Hatamura et al. | |
| 2006/0061045 | A1 | * | 3/2006 | Burg | 277/593 |
| 2008/0237998 | A1 | * | 10/2008 | Chen et al. | 277/595 |

FOREIGN PATENT DOCUMENTS

| DE | 102004011721 A1 | 10/2005 |
| JP | 2000-0280001 A | 1/2000 |
| JP | 2002-031237 | 1/2002 |
| JP | 2002005292 | 1/2002 |
| KR | 1020010066006 | 7/2001 |
| KR | 1020010066006 A | 7/2001 |

OTHER PUBLICATIONS

The Office Action dated Nov. 28, 2006 issued by the Korean Patent Office with an English Translation.
The Search Report issued by the European Patent Office for the corresponding European Patent Application No. 06-010377.7 Dated Mar. 19, 2007.

* cited by examiner

*Primary Examiner*—Alison K Pickard
(74) *Attorney, Agent, or Firm*—Young Basile

(57) ABSTRACT

A gasket which can secure a sufficient sealing capability even for compact, light and less rigid high-performance engines is to be provided. The gasket comprises a metallic base plate and a shim plate stacked around each of combustion chamber holes in the base plate. A base plate bead consisting of a full bead is formed along the circumference of each of the combustion chamber holes. The shim plate is large enough to be arranged opposite a first flat part, a base plate bead formation position A and a second flat part in the base plate. A plurality of strips of auxiliary beads are formed in the part of the shim plate opposite the base plate.

5 Claims, 8 Drawing Sheets

GASKET

BACKGROUND OF THE INVENTION

The present invention relates to a gasket which, intervening between the joining faces of a cylinder block and a cylinder head, is caused to seal the gap between the joining faces by being fastened with fastening bolts.

Gaskets each having a base plate and a shim plate include ones disclosed in JP2002-5292A (hereinafter referred to as Patent Document 1) and JP2002-31237A (hereinafter referred to as Patent Document 2), for instance.

In the gasket disclosed in Patent Document 1, a base plate bead is disposed around a combustion chamber hole in a base plate, and a shim plate is so arranged opposite the base plate as to cover that base plate bead. That shim plate is large enough to oppose the base plate from the edge of the combustion chamber hole in the base plate to the position of a water hole farther outside then the base plate bead. On the shim plate, only one strip of auxiliary bead is so formed as to come into contact with a flat part of the base plate from the bead toward the combustion chamber and a flat part farther out than the combustion chamber. Intervening between the joining faces of the cylinder block and of the cylinder head, the gasket is intended, even if a gap is caused to arise in any less rigid part by the deformation of the engine or any other cause when fastening bolts are fastened, to prevent gas or cooling water from flowing into the base plate bead side as the auxiliary bead formed on the shim plate follows the deformation.

Also in the gasket disclosed in Patent Document 2, a base plate bead is disposed around a combustion chamber hole in a base plate, and a shim plate is so arranged opposite the base plate as to cover that base plate bead. That shim plate is large enough to oppose the base plate from the edge of the combustion chamber hole in the base plate to the position of a water hole farther outside then the base plate bead. The end part of the shim plate toward the combustion chamber hole is folded back to have a double structure, and an auxiliary bead is formed farther out than the base plate bead. Intervening between the joining faces of the cylinder block and of the cylinder head, the gasket deforms, when the fastening bolts are fastened, the engine as much as the difference in plate thickness in the gasket to make the contact pressure higher on the combustion chamber hole than on the base plate bead.

However, since the engine is not a rigid body, a difference in deformation arises between the fastening bolts. To improve this difference in deformation, the doubled side end part of the combustion chamber in the shim plate where the contact pressure is higher is so formed by forging as to vary in thickness in the circumferential direction, so as to uniformize the contact pressure in the circumferential direction by lowering the contact pressure where it is high and raising the contact pressure where it is low.

As an aspect of the rapid progress of technological innovation in recent years, engines are increasingly reduced in size and weight, and this tends to entail a further decrease in engine rigidity. In the gasket according to Patent Document 1, since the shim plate disposed along with the base plate is thinner than the base plate, the spring force of the auxiliary bead formed on the shim plate is correspondingly weaker. Also, as there is only one strip of auxiliary bead formed closer to the combustion chamber than the base plate bead, the contact pressure generated by that auxiliary bead is also lower. As a result, especially between bolts under low contact pressure, the high combustion pressure may deform the single-strip auxiliary bead of the shim plate to let high-temperature gas pass the auxiliary bead to reach the base plate bead. The present inventors found that this heat could also have long-term adverse effects including gradual deterioration of the base plate bead.

In the gasket disclosed in Patent Document 2 on the other hand, the end part of the shim plate toward the combustion chamber hole is folded back to have a double structure with a view to increasing the contact pressure. At the same time, it is also intended to increase the contact pressure in the vicinities of the combustion chamber and uniformize the pressure in the circumferential direction. Though this proves more or less effective in a stationary state, its application to modern engines, which are further weakened in rigidity and made more susceptible to thermal deformation due to a rise in combustion temperature as a result of reductions in size and weight and enhancement in performance entailing increases in the number of valves and the compression ratio and involving improvement in diluted fuel combustion techniques, all as aspects of the rapid progress of technological innovation in recent years. Especially, the application of such gaskets to engines which are subjected to greater thermal deformation between bores due to repetition of rapid heating from a cold state and then of cooling, even if the technique described in Patent Document 1 is used in combination with that of Patent Document 2, would invite pulsation of cylinder heads caused by the explosive pressure of combustion occurring simultaneously with the thermal deformation. Although the deformation could be absorbed in the vicinities of bolts by the elastic region of the bolts, the compliance with deformation would prove insufficient between bolts and between bores for its absorption, and this could let the gas blow through. These problems have also been identified by the inventors, and they would arise more frequently when such gaskets are applied to engines of a high compression ratio, especially diesel engines.

An object of the present invention, attempted in view of these problems, is to provide a gasket with a sufficient sealing capability even for compact, light, less rigid and powerful engines.

SUMMARY OF THE INVENTION

In order to solve the problems cited above, a gasket according to a first aspect of the invention is provided with a base plate, in which combustion chamber holes are opened and a bead is disposed surrounding each of the combustion chamber holes, and a shim plate thinner than the base plate and stacked around each of the combustion chamber of the base plate, the shim plate opposing the formation position of the base plate bead; a first flat part, which is a flat part of the base plate toward the combustion chamber relative to the base plate bead formation position;, and a second flat part, which is a flat part away from the combustion chamber, wherein two or more strips of auxiliary beads extending along the circumference of each combustion chamber hole are disposed in a position in the shim plate opposing the first flat part.

A gasket according to a second aspect of the invention is a version of the gasket according to the first aspect wherein a second auxiliary bead is disposed in a position opposite the second flat part in the shim plate.

A gasket according to a third aspect of the invention is a version of the gasket according to the first or second aspect wherein the part of the shim plate opposite the first flat part is a thickened part whose thickness is increased by stacking two or more shim plates, and the auxiliary beads are formed on at least one of the shim plates constituting the thickened part.

A gasket according to a fourth aspect of the invention is a version of the gasket according to any of the first through third aspects wherein two base plates of the above-described shape are stacked and the shim plate and a sub-plate for adjusting the plate thickness are inserted between the two base plates; and a bulge or bulges formed by bending and deforming the sub-plate in the direction of thickness are so disposed as to extend along the circumference of each combustion chamber hole in at least one of the positions on the sub-plate in which the first flat part and the second flat part overlap each other.

A gasket according to a fifth aspect of the invention is a version of the gasket according to any of the first through fourth aspects wherein two base plates of the above-described shape are stacked and one shim plate of the above-described shape and a sub-plate for adjusting the plate thickness are inserted between the two base plates; and a level gap is provided by offsetting the part opposite the shim plate in the sub-plate to be concave toward the other side below other parts by ⅓ to ⅔ of the total thickness of the opposite shim plate.

The invention makes it possible to provide a gasket which can secure a sufficient sealing capability even for compact, light and less rigid high-performance engines.

DETAILED DESCRIPTION OF THE PREFERRED EMBODIMENTS

A first preferred embodiment of the present invention will be described below with reference to accompanying drawings.

Figure 1:
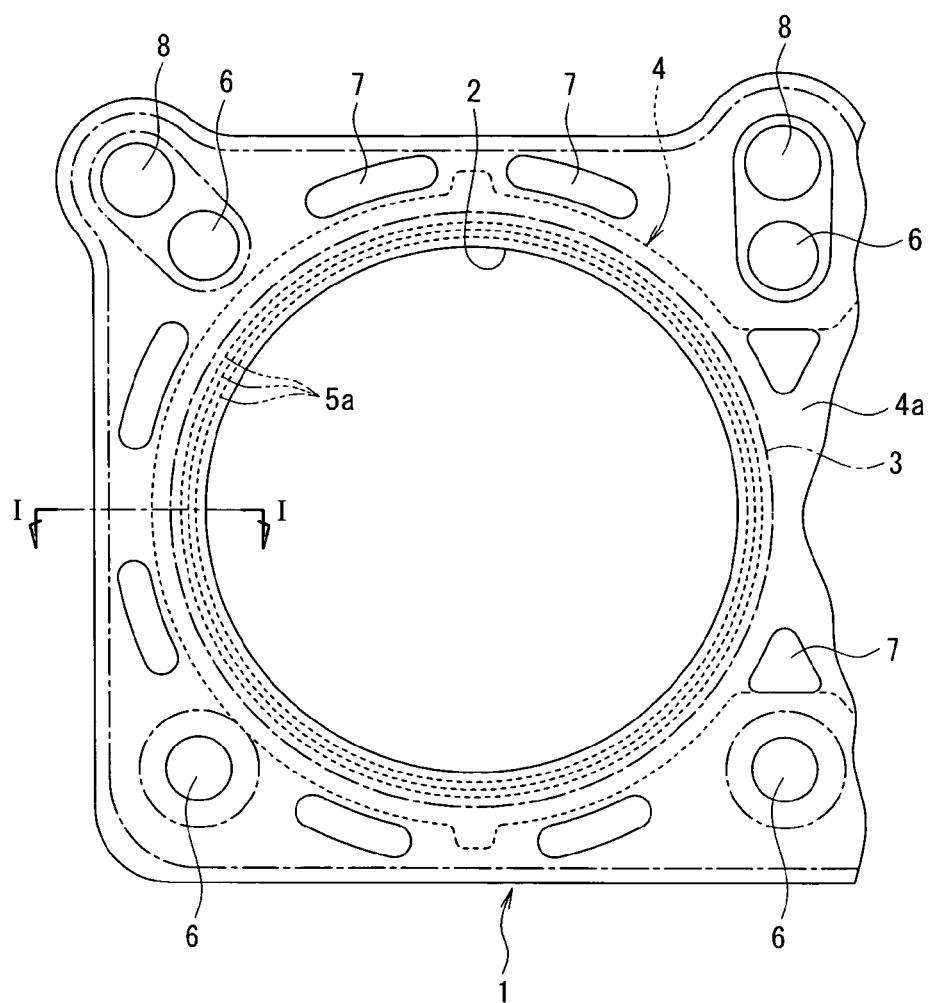
FIG. 1 shows a plan of essential parts of a gasket, which is a first preferred embodiment of the present invention.
Figure 2:
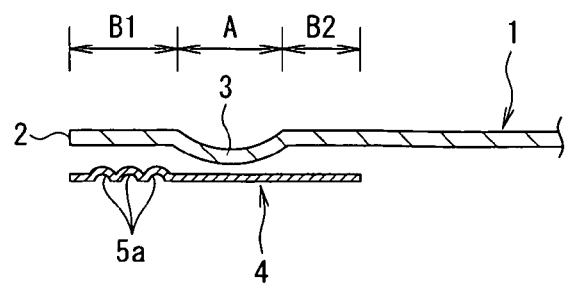
FIG. 2 shows a section along line I-I in FIG. 1.

FIG. 1 shows a plan of essential parts of a gasket, which is a first preferred embodiment of the present invention, and FIG. 2, a section along line I-I in FIG. 1.

(Configuration)

To describe the configuration first, a metal gasket, which is the first preferred embodiment of the invention, comprises a metallic base plate 1 and a shim plate 4, thinner than the base plate 1 and stacked around each of combustion chamber holes 2 in the base plate 1 as shown in FIG. 1 and FIG. 2.

In the base plate 1, the combustion chamber holes 2 are opened in positions matching the bores, and a base plate bead 3 consisting of a full bead is so formed along the circumference of each of those combustion chamber holes 2 as to surround the combustion chamber hole 2. In the outer circumference of the base plate bead 3, liquid holes including water holes 7 and oil holes 8 and bolt holes 6 are opened as appropriate, and another bead is formed where sealing is required.

In the following description, a flat part closer to the combustion chamber than the base plate bead 3 in the base plate 1 will be referred to as a first flat part B1, and a flat part toward the outer circumference of the base plate bead 3, as a second flat part B2. It is desirable for the second flat part B2, which is the flat part between the base plate bead 3, liquid holes 7 and 8 and the bolt holes 6, to be near the base plate bead 3.

The shim plate 4 is formed of an annular sheet having an opening of the same size as the combustion chamber hole 2, large enough to be arranged opposite the first flat part B1, a base plate bead formation position A and the second flat part B2 in the base plate 1. This arrangement creates differences in plate thickness between the surroundings of the combustion chamber hole 2 and other parts.

Incidentally, though each combustion chamber hole 2 is provided with a shim plate 4, adjoining shim plates 4 are combined into a single plate by a link 4a in this embodiment of the invention to facilitate fitting.

The shim plates 4 in this embodiment are so arranged as to cover the convex side of the base plate bead 3 as shown in FIG. 2.

Each of the shim plates 4 is provided with a plurality of strips (three strips in FIG. 2) of auxiliary beads 5a, surrounding the circumference of the combustion chamber hole 2, in the part opposite the first flat part B1 farther toward the combustion chamber hole 2 than the base plate bead formation position A in the base plate 1. Each auxiliary bead 5a is formed by so bending a shim plate 4 in the direction of thickness as to make the base plate 1 side convex, and allows elastic deformation in the direction of thickness. The height of these auxiliary beads 5a is set to be lower than that of the base plate bead 3 of the base plate 1.

The fastening forces of the bolts here are stronger in the vicinities of the bolt holes and weaker between the bolt holes. In this embodiment, though not shown, the height of the auxiliary beads 5a is so varied in the circumferential direction of the combustion chamber holes 2 as to gradually increase from the vicinities of the bolt holes toward the center of the spaces between each pair of bolt holes.(Actions and Effects)

Next, the actions and effects of the gasket of the above-described configuration will be described.

When the gasket of the above-described configuration is fitted between the joining faces of a cylinder block and a cylinder head and fastened with fastening bolts, the base plate bead 3 and the auxiliary bead 5a are deformed by compression in the direction of thickness in that order. By the time the fastening is completed, the difference in thickness between the thicker part around each combustion chamber hole 2 where the shim plate 4 is arranged and other thinner part (the outer edge of the base plate 1) causes the contact pressure to concentrate on the surroundings of the combustion chamber hole 2. The heaviest load works on the surroundings of the cylinder bore end, where the sealing conditions are the most stringent, to seal the circumference of the combustion chamber hole 2.

In this embodiment, as the shim plate 4 is so stacked as also to oppose the base plate bead 3 to create a thickness difference from other parts, the maximum load working on the surroundings of the cylinder bore end (the first flat part B1 part) is lighter than in a configuration where the shim plate 4 is arranged only on the combustion chamber hole 2 side of the base plate bead 3 to create a thickness difference. At the same time, there arise a sealing pressure attributable to the elastic restitutive force of the base plate bead 3 under compressive deformation and a sealing pressure due to the elastic restitutive force of the sealing pressure of the auxiliary bead 5a formed on the combustion chamber hole 2 side of the base plate bead 3, resulting on primary sealing by the auxiliary bead 5a and secondary sealing by the base plate bead 3 against the high-temperature high-pressure combustion gas.

When the engine starts operating, the temperature rises, the contact pressure is also raised by expansion, and a vibration amplitude is also caused to occur by explosion. The two kinds of beads 3 and 5a, differing in plate thickness, bead width and height, have the effect of compensating for each other's shortcomings.

Then, the two or more strips of auxiliary beads 5a formed on the shim plate 4 come into contact with the first flat part B1 closer to the combustion chamber than the base plate bead 3 and are markedly deformed in the vicinities of bolts on which the contact pressure is higher, while they are deformed in proportion to the contact pressure to form the primary sealing between bores and between bolts where the contact pressure is lower. In this embodiment, since two or more strips of auxiliary beads 5a of the shim plate 4 are formed, though this is primary sealing, there are two seal lines in effect.

Thus, since the shim plate 4 is thinner than the base plate 1, the spring force of each individual auxiliary bead 5a formed on the shim plate 4 is weaker, but in this embodiment the contact pressure generated by the auxiliary beads 5a arranged closer to the combustion chamber hole 2 than the base plate bead 3 can be increased by providing auxiliary beads 5a of two or more strips. The labyrinth effect of the auxiliary beads 5a of two more strips can be expected, too. For this reason, even if a high combustion pressure deforms the first strips of the auxiliary beads 5a of the shim plate 4 on the side closer to the combustion chamber hole 2 and high-temperature gas passes the auxiliary beads 5a especially between bolts on which the contact pressure is weaker, sealing by the auxiliary beads 5a toward the outer circumference forbids the high-temperature gas from reaching the base plate bead 3. This prevents such troubles as gradual deterioration of the base plate bead 3 over time by the heat due to contact with high-temperature gas. Modern engines, are weakened in rigidity and made more susceptible to thermal deformation due to a rise in combustion temperature, as a consequence of reductions in size and weight, and enhancement in performance entailing increases in the number of valves and the compression ratio and involving improvement in diluted fuel combustion techniques, all as aspects of the rapid progress of technological innovation in recent years. However, the application of the invention to such engines helps achieve sufficient compliance with deformation between bolts and between bores, and serves to prevent the gas from blow through.

The use of multi-strip auxiliary beads 5a results in a greater pressure borne by the auxiliary beads 5a, which enables the auxiliary beads 5a to serve as stoppers preventing total bending of the base plate bead 3.

The increased pressure applied by the auxiliary beads 5a even between bolts subjected to less fastening pressure causes the auxiliary beads 5a to exert elasticity in the direction of urging the base plate bead 3 upward, and this can serve to prevent the base plate 1 from vibration.

In this way, the gasket of this embodiment is so structured as to compensate for the reduced rigidity of engines which are significantly smaller, lighter and improved in performance.

Figure 3:
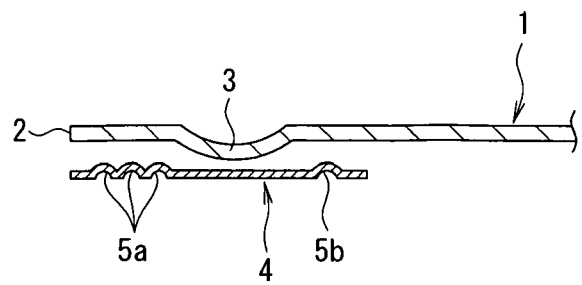
FIG. 3 shows a modification of the first preferred embodiment of the invention.

A second auxiliary bead 5b may also be disposed in the part opposite the second flat part B2 (the part opposite the outer circumference of the base plate bead 3) in the shim plate 4 as shown in FIG. 3.

In this way, as the second auxiliary bead 5b is additionally formed on the outside of the base plate bead 3, a tertiary sealing effect is created as viewed from the bore side, and when the auxiliary beads 5a and 5b formed on the shim plate 4 before and behind the base plate bead 3 and the base plate bead 3 formed on the base plate 1 are fitted to the engine, they work together to form primary, secondary and tertiary seal lines, and perform sealing, each playing its own part in accordance with the rigidity of the engine. For instance, between bolts where the deformation is greater, the base plate bead 3 which is more greatly deformed first begins to be deformed; as its deformation proceeds, the second auxiliary bead 5b of the shim plate 4 close to bolts is deformed by contact; and then the auxiliary bead 5a toward the combustion chamber is deformed, resulting in balancing between the engine rigidity and the spring stress of the gasket when the fastening is completed.

The tertiary sealing by the second auxiliary bead 5b can prevent, with the sealing pressure created by the second auxiliary bead 5b, cooling water from infiltrating toward the base plate bead 3 through the water hole 7.

The height of the auxiliary beads 5a disposed on the combustion chamber hole 2 side of the base plate bead 3 may be set greater than that of the second auxiliary bead 5b arranged away from the combustion chamber hole 2. As the extent of compressive deformation of the auxiliary beads 5a in the position away from the bolt fastening position (the lower contact pressure side) can be increased in this way, the sealing pressures of the two kinds of auxiliary beads 5a and 5b in the radial direction of the combustion chamber hole 2 can be uniformized.

Also, though the space between the auxiliary beads 5a of the shim plate 4 and the base plate bead 3 of the base plate 1 is substantially uniformized in the radial direction in this embodiment, instead the locus of the auxiliary beads 5a can be brought closer to the base plate bead 3 in the vicinities of the bolt holes and away from the base plate bead 3 between the bolt holes, and the contact pressure can be adjusted to uniformize the sealing pressure in the radial direction.

Further, though the multi-strip auxiliary bead 5a opposite the first flat part B1 is formed of a full bead in the configuration described above, it need not be a full bead, but auxiliary beads 5a of two or more strips may as well be formed by combining stepwise half beads for instance. Depending on the conditions of use, full beads and half beads may be used differentially.

Figure 4:
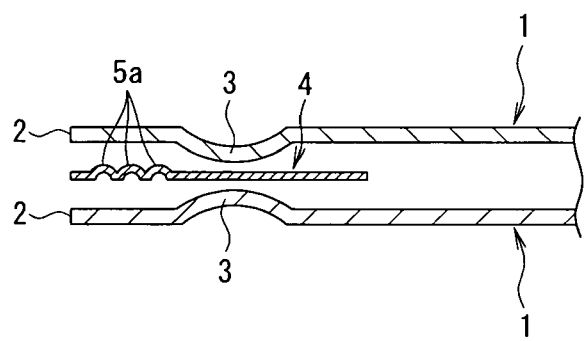
FIG. 4 shows another modification of the first embodiment of the invention.
Figure 5:
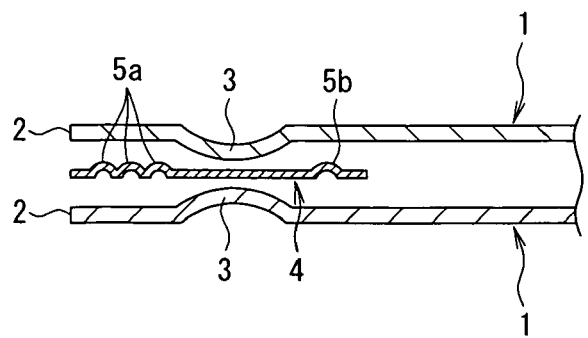
FIG. 5 shows another modification of the first embodiment of the invention.

The base plate 1 need not be only one. For instance, two base plates 1 may be stacked, with the shim plate 4 sandwiched between the two base plates 1 as shown in FIG. 4 and FIG. 5. Although the convex sides of the upper and lower base plates 1 of the base plate beads 3 are opposed to each other in these examples, their concave sides may as well be opposed to each other. There may also be two or more shim plates 4.

Figure 6:
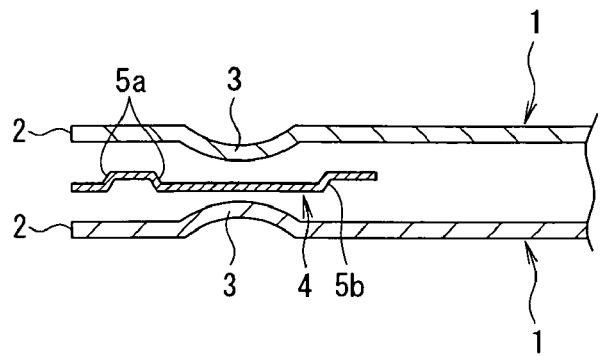
FIG. 6 shows another modification of the first embodiment of the invention.
Figure 7:
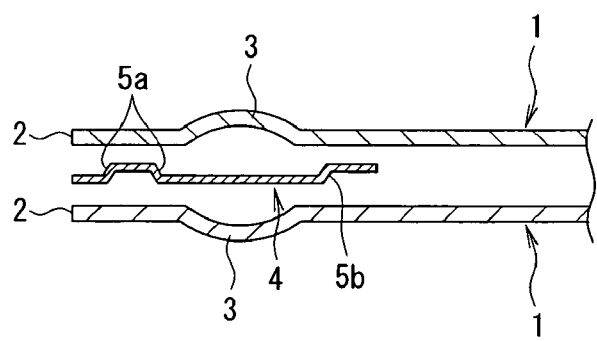
FIG. 7 shows another modification of the first embodiment of the invention.

Modifications shown in FIG. 6 and FIG. 7 are respectively cases in which double-strip auxiliary beads 5a and second auxiliary beads 5b are formed of stepwise half beads and the concave sides of the base plate beads 3 are opposed to each other.

(Second Embodiment)

Next, a second preferred embodiment of the present invention will be described below with reference to accompanying drawings. Similar parts to their counterparts in the first embodiment described above will be denoted by respectively the same reference signs in the following description.(Configuration)

Figure 8:
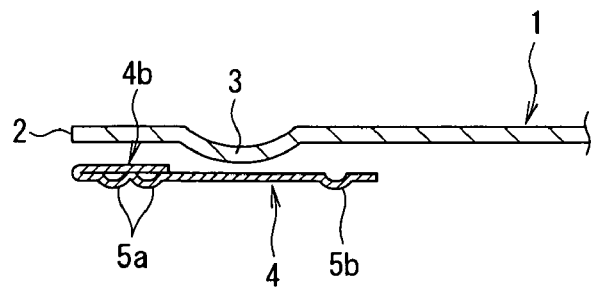
FIG. 8 shows a section of a gasket, which is a second preferred embodiment of the invention.

Whereas the basic configuration of the gasket of this embodiment is similar to that of the first embodiment as shown in FIG. 8, the part of the shim plate 4 opposite the first flat part B1 is increased in thickness.

Thus, the part of the shim plate 4 toward the combustion chamber hole 2 is made a thickened part 4b by stacking two layers of the shim plate 4.(Actions and Effects)

This gasket has the following actions and effects in addition to those already described.

Thus, by increasing the thickness of the part of the shim plate closer to the combustion chamber than the base plate bead 3, the contact pressure on the first flat part BI is increased. As a result, the pulsation amplitude during engine operation is reduced even further to enable the auxiliary beads 5a formed on the shim plate 4 to comply with the deformation.

Further, by increasing the thickness of the part of the shim plate 4 opposite the first flat part B1, the total bending of the base plate bead 3 can be prevented correspondingly.

Although this embodiment is an example in which the multi-strip auxiliary beads 5a are formed in the non-folded part of the shim plate 4 stacked over the first flat part B1, it is also acceptable to dispose multi-strip auxiliary beads 5a in the folded part or to dispose two auxiliary beads 5a individually.

Also, the thickened part 4b may as well be formed by joining a plurality of shim plates 4 by caulking or otherwise.

Figure 9:
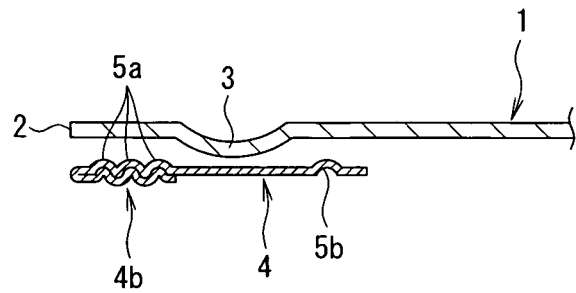
FIG. 9 shows a modification of the second preferred embodiment of the invention.

It is also acceptable to configure two or more strips of stacked auxiliary beads 5a by so forming an equivalent of two shim plates 4, arranged opposite the first flat part B1, in the direction of thickness as to corrugate together as shown in FIG. 9.

Figure 10:
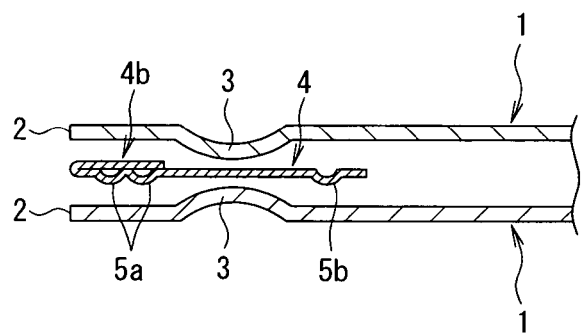
FIG. 10 shows another modification of the second embodiment of the invention.
Figure 11:
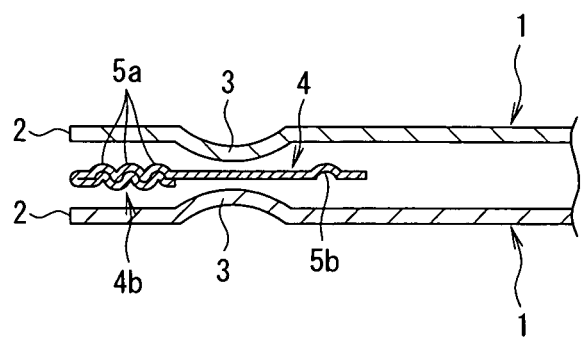
FIG. 11 shows another modification of the second embodiment of the invention.

The base plate 1 here need not be only one. For instance, two base plates 1 may be stacked, with the shim plate 4 sandwiched between the two base plates 1 as shown in FIG. 10 and FIG. 11. In these examples the convex sides of the base plate beads 3 of the upper and lower base plates 1 are opposed to each other. There may also be two or more shim plates 4.

Also, the concave sides of the base plate beads 3 of the two stacked base plate 1 may as well be opposed to each other.

(Third Embodiment)

Next, a third preferred embodiment of the present invention will be described below with reference to accompanying drawings. Similar parts to their counterparts in the first embodiment described above will be denoted by respectively the same reference signs in the following description.(Configuration)

Figure 12:
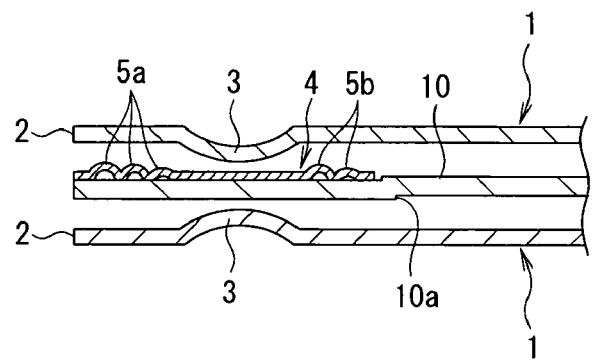
FIG. 12 shows a section of a gasket, which is a third preferred embodiment of the invention.

The gasket of this embodiment has two base plates 1, each provided with the base plate bead 3, stacked one over the other, with a single shim plate 4 having the auxiliary beads 5a inserted, together with a sub-plate 10 for thickness adjustment, between the two base plates 1 as shown in FIG. 12. The sub-plate 10 is a plate of substantially the same size as the base plate 1, and is thicker than the base plate 1 in this embodiment as it is shown here.

In further detail, the convex sides of the base plate beads 3 of the upper and lower base plates 1 are so stacked as to oppose each other. By offsetting the part opposite the shim plate 4 in the sub-plate 10 (the range in which the shim plate 4 comes into contact) by ½ of the total thickness of the shim plate 4 below other parts, a level gap 10a is provided on the combustion chamber hole 2 side. That level gap 10a enables the shim plate 4 to be mounted in (fitted into) the concave of the level gap 10a formed in the upper face of the sub-plate 10. The extent of offset here can be set between ⅓ and ⅔. More preferably, it is ½ of the thickness of the shim plate 4 in the opposing part.

Auxiliary beads 5a and 5b are formed on the shim plate 4 as in the foregoing embodiment. Every one of the auxiliary beads 5a and 5b is a full bead, the auxiliary beads 5a are set higher than the auxiliary beads 5b. (Actions and Effects)

By inserting the sub-plate 10 in this way, the gasket can be adjusted to a desired thickness.

Further by providing the level gap 10a equal to ½ of thickness of the shim plate 4 on the sub-plate 10, uniform loads can be imposed on the upper and lower the base plates 1 when fastening the bolts.

Although this embodiment is a case in which the shim plate 4 is arranged opposite the upper base plate 1 alone, the shim plate 4 may as well be disposed between the sub-plate 10 and the lower base plate 1 or shim plates 4 may also be provided both over and underneath the sub-plate 10. When shim plates 4 are to be arranged both over and underneath the sub-plate 10, there is no need to dispose the level gap 10a. It is also acceptable, though, to facilitate positioning by forming concaves into which the shim plates 4 are to be fitted in both the upper and lower faces of the sub-plate 10.

Figure 13:
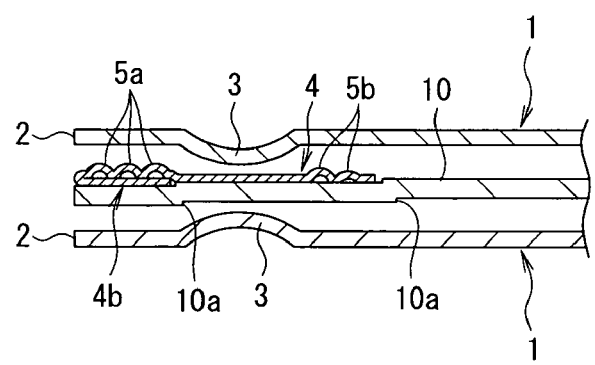
FIG. 13 shows a modification of the third preferred embodiment of the invention.

Or where the part of the shim plate 4 opposite the first flat part B1 is increased in thickness as shown in FIG. 13, a second level gap 10a can be provided in the part opposite the thickened part 4b to half that additional thickness, namely the thickness of one shim plate 4.

Although two level gaps 10a are formed according to the thickness of the opposite shim plate 4 in the configuration shown in FIG. 13, the second level gap 10a is not absolutely necessary in the part opposite the thickened part 4b. Even in this case, the extent of offset can be kept within ⅓ to ⅔ of the total thickness of the opposite plates. (Fourth Embodiment).

Next, a fourth preferred embodiment of the present invention will be described below with reference to accompanying drawings. Similar parts to their counterparts in the third embodiment described above will be denoted by respectively the same reference signs in the following description.(Configuration)

Figure 14:
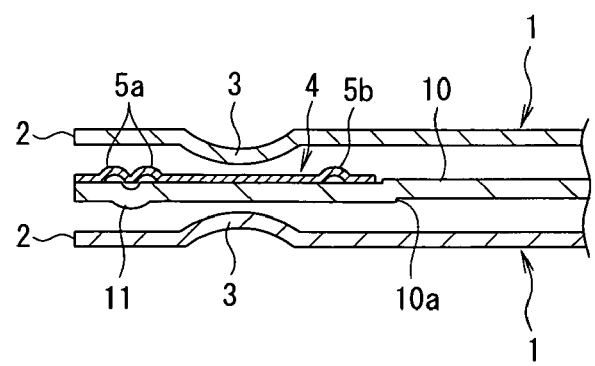
FIG. 14 shows a section of a gasket, which is a fourth preferred embodiment of the invention.

The gasket of this embodiment is similar in basic structure to that of the above-described third embodiment as shown in FIG. 14, though different in that this embodiment has a bulge 11 on the sub-plate 10.

In this embodiment, the bead-shaped bulge 11 is so bent and deformed as to protrude in the direction of thickness toward the part overlapping the area where the multi-strip auxiliary beads 5a are disposed on the sub-plate 10. This bulge 11 protrudes less than the base plate bead 3, extends along the circumference of the combustion chamber hole 2 and undergoes plastic deformation by a load in the direction of thickness.

In order to make plastic deformation the predominant factor in the deformation of the bulge 11 by the load in the direction of thickness, the sub-plate 10 can be fabricated of a relatively soft metal, such as a zinc-plated iron sheet. In terms of hardness index, the sub-plate 10 can be formed of a material of Hv 200 or less.

This embodiment is similar to the earlier-described third embodiment in other aspects of configuration.(Actions and Effects)

In this embodiment, the load borne by the first flat part B1 when the bolts are fastened is made greater by the presence of the multi-strip auxiliary beads 5a than where a single-strip auxiliary bead 5a is disposed. At the same time, the bulge 11 of the sub-plate 10 is subjected to a load according to the imposed load, and undergoes plastic deformation corresponding to the weight of the load. Then, since the load is less between the bolt holes than in the vicinities of the bolt holes when the bolts are fastened, different parts of the bulge 11 undergo plastic deformation to adjust the height automatically. As a result, while the plastic deformation of the bulge 11 prevents the contact pressure on the bore circumference from rising too high, the thickness of the gasket in the circumferential direction is automatically increased or decreased according to the load level at the time of fastening is automatically uniformize the contact pressure on the bore circumference in the circumferential direction. For this reason, the contact pressure on the bore circumference in the circumferential direction can be uniformized without having to accurately increase or decrease the height of the auxiliary beads 5a in the circumferential direction according to the level of the pre-applied load or even if the height is neither increased nor decreased at all.

Incidentally, the height and width of the bulge 11 to undergo plastic deformation may as well be varied in the circumferential direction in advance. In this case, the bulge 11 may be so adjusted as to become higher or narrower between the bolt holes than elsewhere. The higher or the narrower it is, the more rigid will the bulge 11 become, accordingly the more difficult to be crushed and easier to bear the load.

Though the embodiment as described above is supposed to have only a single strip of the bulge 11 by way of example, it may have two or more strips. Also, as it is desired to make the gasket thicker between the bolt holes than elsewhere on the bore circumference, the bulge 11 may be disposed along the combustion chamber hole 2 only in the parts between bolt holes.

Figure 15:
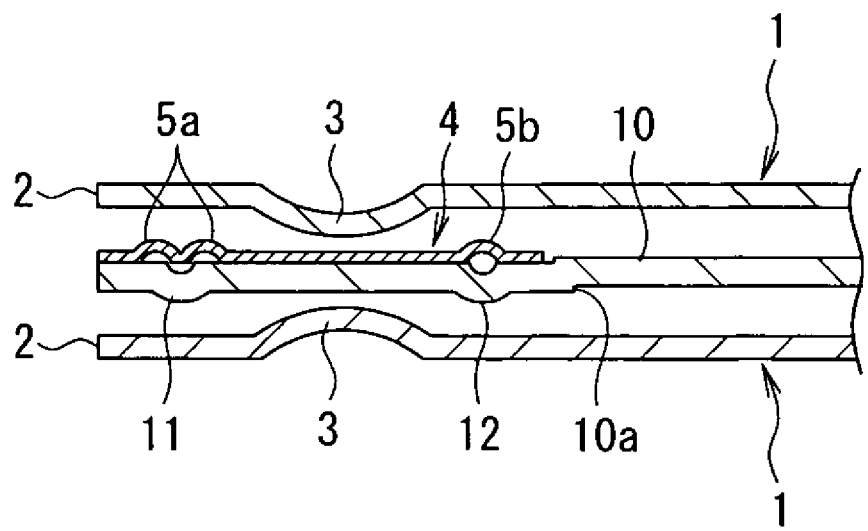
FIG. 15 shows a modification of the fourth preferred embodiment of the invention.

Or, another bulge 11 extending in the circumferential direction may also be disposed in the part opposite a second auxiliary base plate bead formation position A in the second flat part B2 as shown in FIG. 15. In this way, the contact pressure in the circumferential direction in the second auxiliary base plate bead formation position A can be uniformized, enabling the auxiliary beads 5a to generate an appropriate contact pressure even between the bolt holes. This would make it more difficult for liquid from the liquid holes to infiltrate from the base plate bead 3 side, and the useful life of the base plate bead 3, namely that of the gasket, to be elongated.

Figure 16:
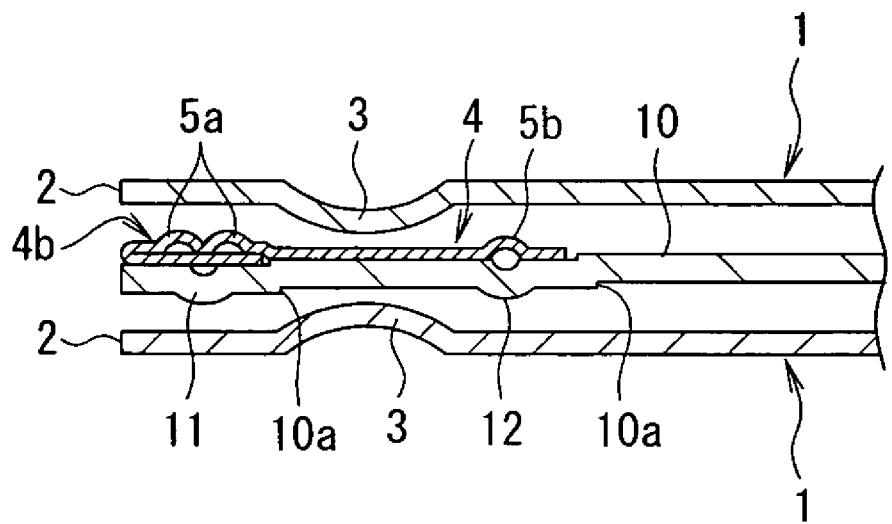
FIG. 16 shows another modification of the fourth embodiment of the invention.
Figure 17:
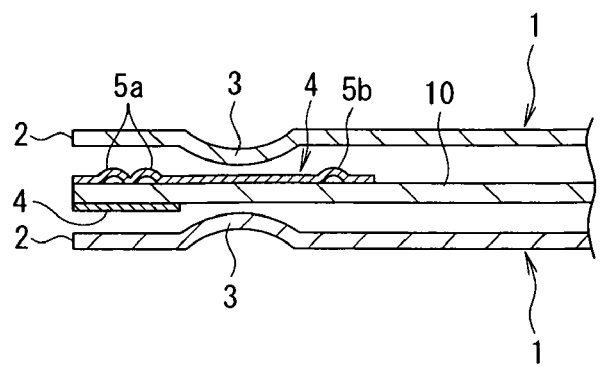
FIG. 17 shows another modification of the embodiments of the invention.
Figure 18:
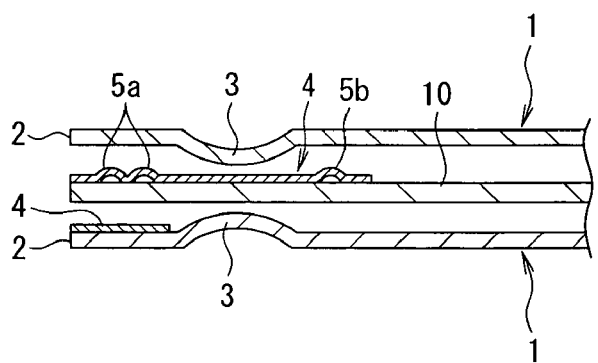
FIG. 18 shows another modification of the embodiments of the invention.
Figure 19:
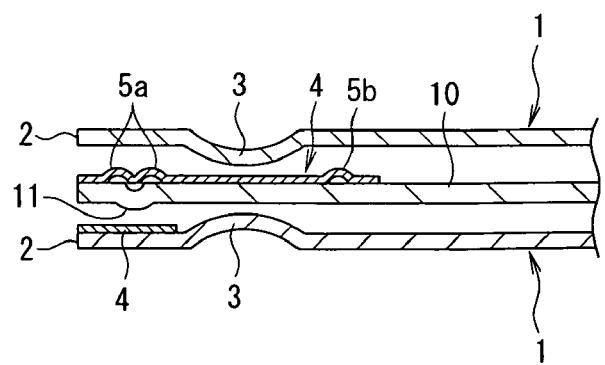
FIG. 19 shows another modification of the embodiments of the invention.
Figure 20:
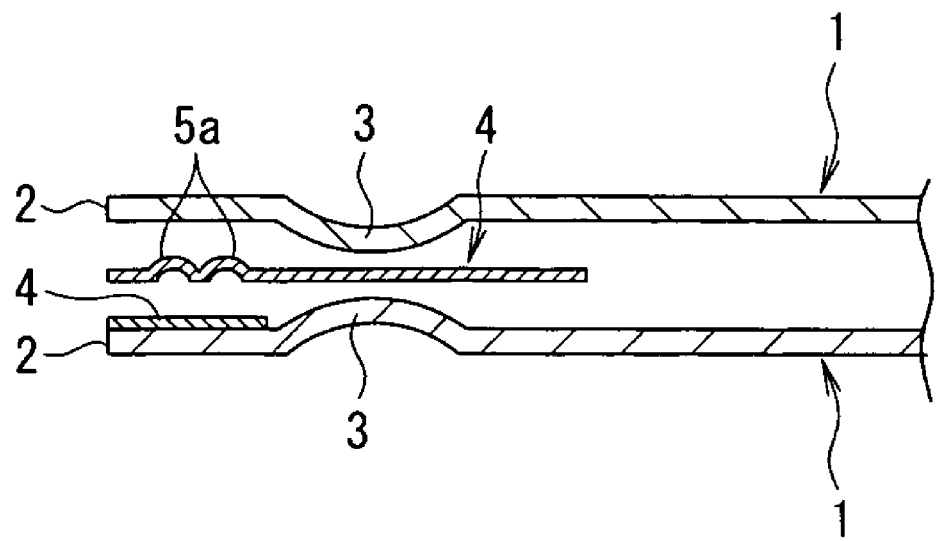
FIG. 20 shows another modification of the embodiments of the invention.
Figure 21:
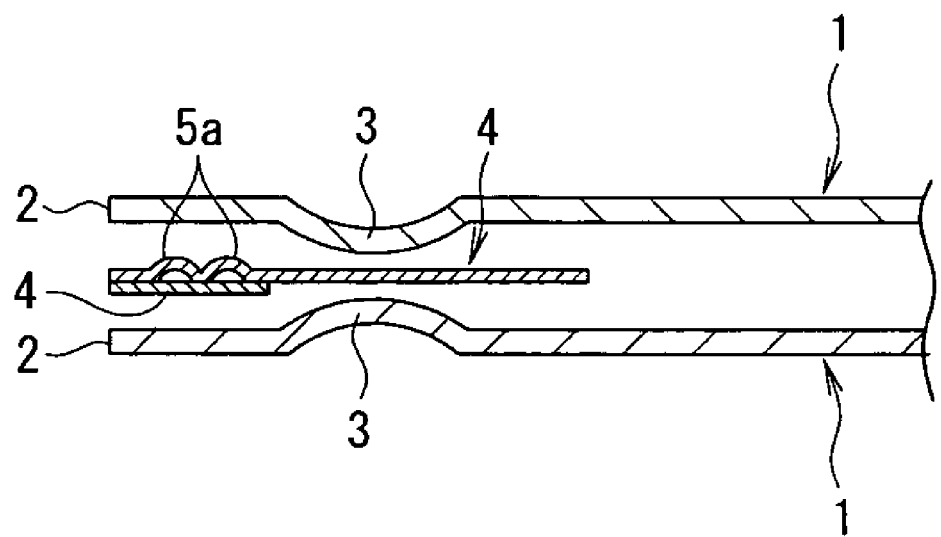
FIG. 21 shows another modification of the embodiments of the invention.

Or as shown in FIG. 16, two or more thickened parts 4b may be formed on the part of the shim plate 4 opposite the first flat part B1 of the base plate 1.

Regarding every embodiment of the invention described so far, folding the end part is shown, in FIG. 10 for instance, as the way to stack two or more shim plates 4 in the position opposite the first flat part, the way to stack them is not limited to this. Another shim plate 4 may be stacked as well, or the sub-plate 10 may intervene between the stacked shim plates 4; nor is it necessary for the stacked shim plates 4 and 4 to be linked to each other. Examples of such alternatives are shown in FIG. 17 through FIG. 21. Incidentally, FIGS. 17 through 20 show cases in which one of the shim plates 4 is fixed to the sub-plate 10 or the base plate 1 by welding or otherwise. Further, three or more shim plates 4 may be stacked as stated above.

What is claimed is:

1. A gasket comprising:
   a base plate provided with combustion chamber holes and base plate beads, each disposed to surround each of the combustion chamber holes;
   a shim plate thinner than the base plate and stacked around each of the combustion chamber holes of the base plate, said shim plate disposed to extend from a first flat part, which is a flat part of the base plate from each of the combustion chamber holes to the base plate bead, through a position where the base plate bead is formed, to a second flat part, which is another flat part spaced away from each of the combustion chamber holes; and
   two or more strips of deformable auxiliary beads extending along the circumference of each of the combustion chamber holes so as to form seal lines, respectively, being disposed in a position opposing said first flat part, and protruding on one side of said shim plate, wherein a flat portion on the shim plate adjacent to the two or more strips of auxiliary beads is spaced from each of the combustion chamber holes by the two or more strips of auxiliary beads, the flat portion of the shim plate opposing the base plate bead, and wherein a part of the shim plate opposing said first flat part is a thickened part whose thickness is increased by stacking one or more additional shim plates, such that only the part of the shim plate opposing the first flat part is thickened, and said auxiliary beads are formed on at least one of the shim plates constituting the thickened part.

2. The gasket according to claim 1, wherein a second auxiliary bead is disposed in a position opposing said second flat part, in said shim plate.

3. The gasket according to claim 1, further comprising another base plate and a sub-plate, and wherein the two base plates are stacked and said shim plate and a sub-plate for adjusting the plate thickness are interposed between the two base plates; and wherein the sub-plate comprises one or more bead-shaped bulges formed by bending and deforming the sub-plate in the thickness direction, the bulges disposed to extend along the circumference of each of the combustion chamber holes in at least one of the positions, on said sub-plate, in which said first flat part and second flat part of the two base plates overlap each other.

4. The gasket according to claim 1 wherein two base plates of said shape are stacked and one shim plate of said shape and a sub-plate for adjusting the plate thickness are inserted between the two base plates; and
   a level gap is provided by offsetting the part opposite said shim plate in said sub-plate to be concave toward the other side below other parts by ⅓ to ⅔ of the total thickness of the opposite shim plate.

5. A gasket comprising a pair of base plates each having opened combustion chamber holes in alignment with each other, each base plate having a bead surrounding each of the combustion chamber holes, and a shim plate thinner than each of the base plates and disposed therebetween, said shim plate stacked around each of the combustion chamber holes of the base plate, each base plate having a first flat part toward the combustion chamber hole relative to the bead position and a second flat part spaced from the combustion chamber hole by the bead, wherein:

the shim plate comprises two or more strips of auxiliary beads disposed on the shim plate and extending along the circumference of each combustion chamber hole, and a flat portion on the shim plate adjacent to the two or more strips of auxiliary beads spaced from the combustion chamber holes by the two or more strips of auxiliary beads, said two or more strips of auxiliary beads disposed in a position in said shim plate opposing the first flat part, the flat portion of the shim plate opposing the bead on each base plate, and wherein a part of the shim plate opposing said first flat part is a thickened part whose thickness is increased by stacking one or more additional shim plates, such that only the part of the shim plate opposing the first flat part is thickened, and said auxiliary beads are formed on at least one of the shim slates constituting the thickened part.

\* \* \* \* \*